US012663152B2

(12) United States Patent
Moura et al.

(10) Patent No.: US 12,663,152 B2
(45) Date of Patent: *Jun. 23, 2026

(54) APPARATUS AND METHOD FOR MITIGATING PARTICULATE ACCUMULATION ON A COMPONENT OF A GAS TURBINE

(71) Applicant: RTX Corporation, Farmington, CT (US)

(72) Inventors: Dennis M. Moura, South Windsor, CT (US); Carey Clum, East Hartford, CT (US)

(73) Assignee: RTX CORPORATION, Farmington, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 17/839,188

(22) Filed: Jun. 13, 2022

(65) Prior Publication Data

US 2022/0316705 A1 Oct. 6, 2022

Related U.S. Application Data

(62) Division of application No. 16/226,892, filed on Dec. 20, 2018, now Pat. No. 11,359,810.

(Continued)

(51) Int. Cl.
*F23R 3/00* (2006.01)
*F23M 5/04* (2006.01)
(Continued)

(52) U.S. Cl.
CPC ............... *F23R 3/002* (2013.01); *F23M 5/04* (2013.01); *F23M 5/08* (2013.01); *F23R 3/60* (2013.01);
(Continued)

(58) Field of Classification Search
CPC .. F23R 3/002; F23R 3/60; F23R 2900/00004; F23R 2900/00017; F23R 2900/03041;
(Continued)

(56) References Cited

U.S. PATENT DOCUMENTS 6,718,774 B2 4/2004 Razzell
8,448,416 B2 5/2013 Davis, Jr. et al.
(Continued)

FOREIGN PATENT DOCUMENTS

EP 2743585 A1 6/2014
EP 3086041 A1 10/2016
(Continued)

OTHER PUBLICATIONS

The Extended European Search Report for Application No. 18215287.6-1009; Report Issued Date: Feb. 27, 2019; Report Received Date: Feb. 22, 2019; 12 pages.

*Primary Examiner* — Rodolphe Andre Chabreyrie
(74) *Attorney, Agent, or Firm* — CANTOR COLBURN LLP

(57) ABSTRACT

A gas turbine engine component assembly is provided. The gas turbine engine component assembly comprising: a first component having a first surface and a second surface; a threaded stud including a first end and a second end opposite the first end, the threaded stud extending from the second surface of the first component; and a faired body operably secured to the threaded stud, wherein the faired body is shaped to redirect the airflow in a lateral direction parallel to the second surface of the first component such that a cross flow is generated.

12 Claims, 7 Drawing Sheets

Related U.S. Application Data

(60) Provisional application No. 62/609,610, filed on Dec. 22, 2017.

(51) Int. Cl.
*F23M 5/08* (2006.01)
*F23R 3/60* (2006.01)

(52) U.S. Cl.
CPC .... *F05D 2240/35* (2013.01); *F05D 2260/201* (2013.01); *F23R 2900/00004* (2013.01); *F23R 2900/00017* (2013.01); *F23R 2900/03043* (2013.01); *F23R 2900/03044* (2013.01); *F23R 2900/03045* (2013.01)

(58) Field of Classification Search
CPC .. F23R 2900/03042; F23R 2900/03043; F23R 2900/03044; F23R 2900/03045; F05D 2240/35; F05D 2260/201–202; F05D 2260/607; F23M 5/04; F23M 5/08
See application file for complete search history.

(56) References Cited

U.S. PATENT DOCUMENTS

| | | | |
|---|---|---|---|
| 9,422,830 | B2 | 8/2016 | Gerendás et al. |
| 9,518,737 | B2 | 12/2016 | Pidcock et al. |
| 9,644,843 | B2 | 5/2017 | Herborth |
| 10,408,452 | B2 | 9/2019 | Rimmer et al. |
| 10,619,857 | B2 | 4/2020 | Lemoine et al. |
| 10,690,346 | B2 | 6/2020 | Propheter-Hinckley et al. |
| 2011/0113785 | A1 | 5/2011 | Tschuor et al. |
| 2013/0047618 | A1 | 2/2013 | Gregory |
| 2014/0230440 | A1 | 8/2014 | Summers |
| 2015/0176434 | A1 | 6/2015 | Gerendas et al. |
| 2016/0313004 | A1 | 10/2016 | Chang et al. |
| 2017/0108219 | A1 | 4/2017 | Rimmer et al. |
| 2017/0298824 | A1 | 10/2017 | Gerendas et al. |
| 2019/0195496 | A1 | 6/2019 | Moura et al. |

FOREIGN PATENT DOCUMENTS

| | | | |
|---|---|---|---|
| EP | 3382279 | A1 | 10/2018 |
| GB | 2356041 | A | 5/2001 |

APPARATUS AND METHOD FOR MITIGATING PARTICULATE ACCUMULATION ON A COMPONENT OF A GAS TURBINE

CROSS-REFERENCE TO RELATED APPLICATIONS

This application is a division of U.S. application Ser. No. 16/226,892 filed Dec. 20, 2018, which claims the benefit of U.S. Provisional Application No. 62/609,610 filed Dec. 22, 2017, the contents each of which are incorporated herein by reference in its entirety.

BACKGROUND

The subject matter disclosed herein generally relates to gas turbine engines and, more particularly, to a method and apparatus for mitigating particulate accumulation on cooling surfaces of components of gas turbine engines.

In one example, a combustor of a gas turbine engine may be configured and required to burn fuel in a minimum volume. Such configurations may place substantial heat load on the structure of the combustor (e.g., panels, shell, etc.). Such heat loads may dictate that special consideration is given to structures, which may be configured as heat shields or panels, and to the cooling of such structures to protect these structures. Excess temperatures at these structures may lead to oxidation, cracking, and high thermal stresses of the heat shields or panels. Particulates in the air used to cool these structures may inhibit cooling of the heat shield and reduce durability. Particulates, in particular atmospheric particulates, include solid or liquid matter suspended in the atmosphere such as dust, ice, ash, sand and dirt.

SUMMARY

According to one embodiment, a gas turbine engine component assembly is provided. The gas turbine engine component assembly comprising: a first component having a first surface and a second surface; a threaded stud including a first end and a second end opposite the first end, the threaded stud extending from the second surface of the first component; and a faired body operably secured to the threaded stud, wherein the faired body is shaped to redirect the airflow in a lateral direction parallel to the second surface of the first component such that a cross flow is generated.

In addition to one or more of the features described above, or as an alternative, further embodiments may include: a second component having a first surface, a second surface opposite the first surface of the second component, a cooling hole extending from the second surface of the second component to the first surface of the second component through the second component, and a receiving aperture extending from the second surface to the first surface through the second component, wherein the first surface of the second component and the second surface of the first component define a cooling channel therebetween in fluid communication with the cooling hole for cooling the second surface of the first component, wherein the threaded stud extends from the second surface of the first component through the cooling channel and through the receiving aperture of the second component.

In addition to one or more of the features described above, or as an alternative, further embodiments may include: an injection aperture fluidly connecting airflow in an airflow path proximate the second surface of the second component to the cooling channel and configured to convey the airflow into the cooling channel towards the faired body.

In addition to one or more of the features described above, or as an alternative, further embodiments may include that the faired body is integrally formed from at least one of the first component and the threaded stud.

In addition to one or more of the features described above, or as an alternative, further embodiments may include that the faired body is a fillet between the threaded stud and the first component.

In addition to one or more of the features described above, or as an alternative, further embodiments may include that the injection aperture is located in the threaded stud, the injection aperture being fluidly connected to the airflow in the airflow path through a passageway in the threaded stud.

In addition to one or more of the features described above, or as an alternative, further embodiments may include: a nut located at the second end of the threaded stud, the having internal threads configured to mesh with external threads located on a cylindrical surface of the threaded stud at the second end of the threaded stud.

In addition to one or more of the features described above, or as an alternative, further embodiments may include: a washer axially interposed between the nut and the outward surface of the second component, wherein the injection aperture is located in the washer, the injection aperture being fluidly connected to the airflow in the airflow path.

In addition to one or more of the features described above, or as an alternative, further embodiments may include: a washer axially interposed between the nut and the second surface of the second component, the nut being offset from the washer creating an airflow channel therein, wherein the injection aperture is fluidly connected to the airflow in the airflow path through the airflow channel.

In addition to one or more of the features described above, or as an alternative, further embodiments may include that the injection aperture is fluidly connected to the cooling channel through the receiving aperture.

In addition to one or more of the features described above, or as an alternative, further embodiments may include: a plurality of push pins encircling the threaded stud, each of the plurality of push pins extending out from the second surface of the first component into the cooling channel, wherein the faired body is integrally formed with each of the plurality of push pins, the plurality of push pins being shaped into channel walls such that airflow is channeled away from the threaded stud through channels radially interposed between the channel walls.

In addition to one or more of the features described above, or as an alternative, further embodiments may include: an air dam partially encircling the threaded stud, the air dam extending out from the second surface of the first component into the cooling channel, wherein the air dam is configured to redirect air flow that has been redirected by the faired body and generate a lateral air flow in a selected direction in the cooling channel.

According to another embodiment, a combustor for use in a gas turbine engine is provided. The combustor enclosing a combustion chamber having a combustion area. The combustor comprises: a combustion liner having an inner surface and an outer surface opposite the inner surface wherein the combustion liner includes a primary aperture extending from the outer surface to the inner surface through the combustion liner and a receiving aperture extending from the outer surface to the inner surface through the combustion liner; a heat shield panel interposed between the inner surface of the liner and the combustion area, the heat shield panel having a first surface and a second surface opposite the first surface, wherein the second surface is oriented towards the inner surface, and wherein the heat shield panel is separated from the liner by an impingement cavity; a threaded stud including a first end and a second end opposite the first end, the threaded stud extending from the second surface of the heat shield panel through the impingement cavity and through the receiving aperture of the combustion liner, wherein the first end is located proximate the second surface of the heat shield panel; an injection aperture fluidly connecting airflow in an airflow path proximate the outer surface of the combustion liner to the impingement cavity and configured to convey the airflow into the impingement cavity; and a faired body operably secured to the threaded stud within the impingement cavity, wherein the injection aperture is configured to direct the airflow towards the faired body and the faired body is shaped to redirect the airflow in a lateral direction parallel to the second surface of the heat shield panel such that a cross flow is generated in the impingement cavity.

In addition to one or more of the features described above, or as an alternative, further embodiments may include that the faired body is integrally formed from at least one of the heat shield panel and the threaded stud.

In addition to one or more of the features described above, or as an alternative, further embodiments may include that the faired body is a fillet between the threaded stud and the heat shield panel.

In addition to one or more of the features described above, or as an alternative, further embodiments may include that the injection aperture is located in the threaded stud, the injection aperture being fluidly connected to the airflow in the airflow path through a passageway in the threaded stud.

In addition to one or more of the features described above, or as an alternative, further embodiments may include: a nut located at the second end of the threaded stud, the having internal threads configured to mesh with external threads located on a cylindrical surface of the threaded stud at the second end of the threaded stud.

In addition to one or more of the features described above, or as an alternative, further embodiments may include: a washer axially interposed between the nut and the outward surface of the combustion liner, wherein the injection aperture is located in the washer, the injection aperture being fluidly connected to the airflow in the airflow path.

In addition to one or more of the features described above, or as an alternative, further embodiments may include: a washer axially interposed between the nut and the outward surface of the combustion liner, the nut being offset from the washer creating an airflow channel therein, wherein the injection aperture is fluidly connected to the airflow in the airflow path through the airflow channel.

In addition to one or more of the features described above, or as an alternative, further embodiments may include that the injection aperture is fluidly connected to the impingement cavity through the receiving aperture.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

Figure 4A:
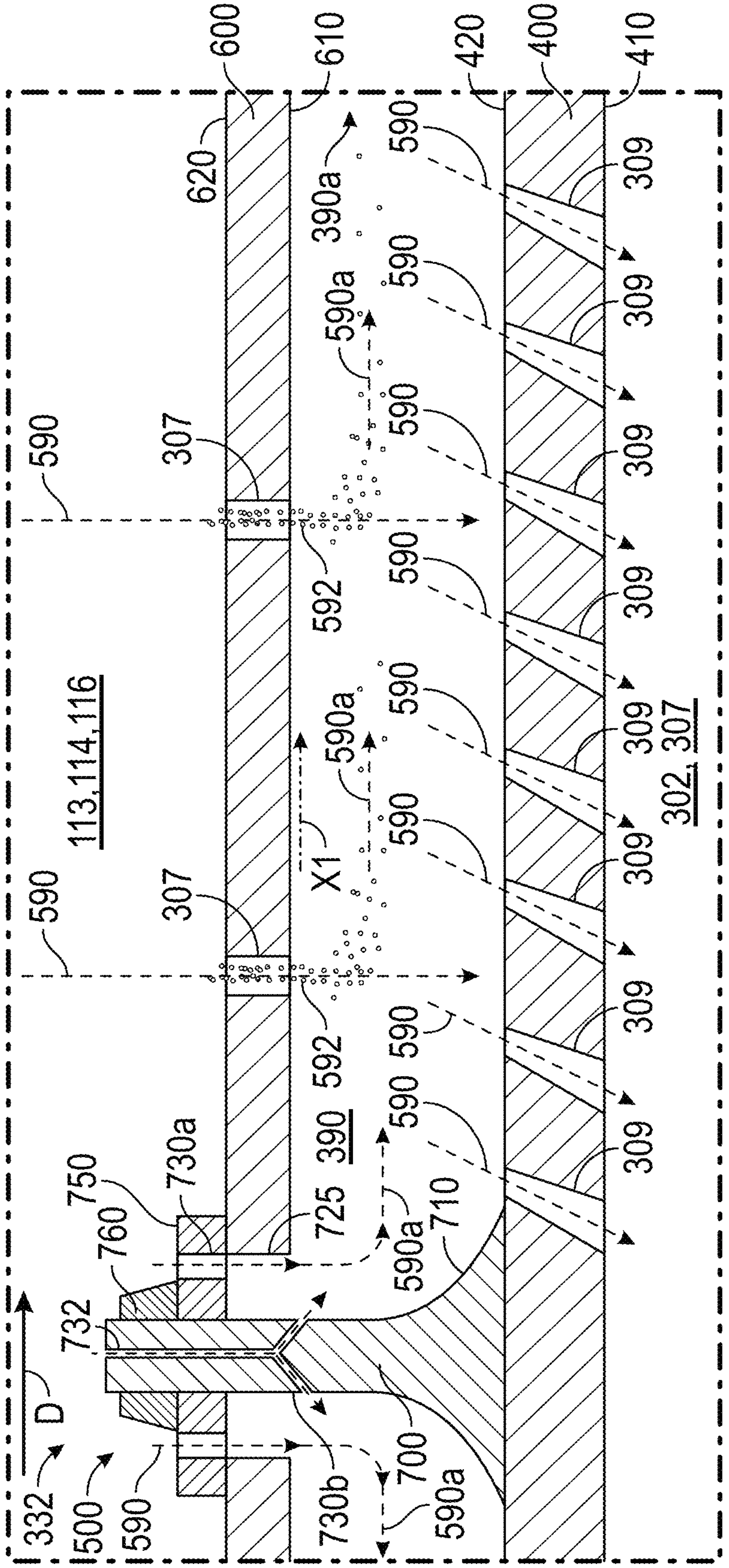
FIG. 4A is an illustration of a configuration of lateral flow injection using a faired body attached to a threaded stud for a combustor of a gas turbine engine, in accordance with an embodiment of the disclosure.
Figure 4B:
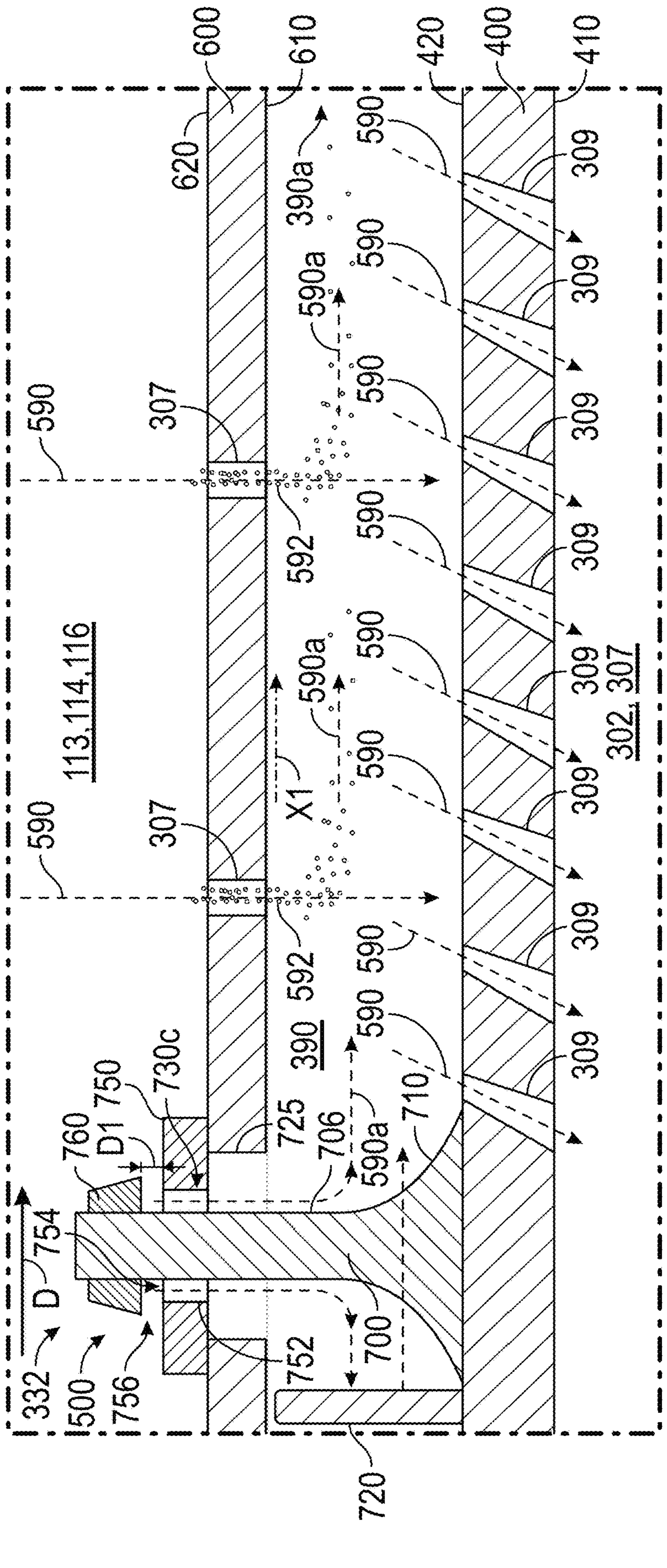
FIG. 4B is an illustration of a configuration of lateral flow injection using a faired body attached to a threaded stud for a combustor of a gas turbine engine, in accordance with an embodiment of the disclosure.
Figure 4C:
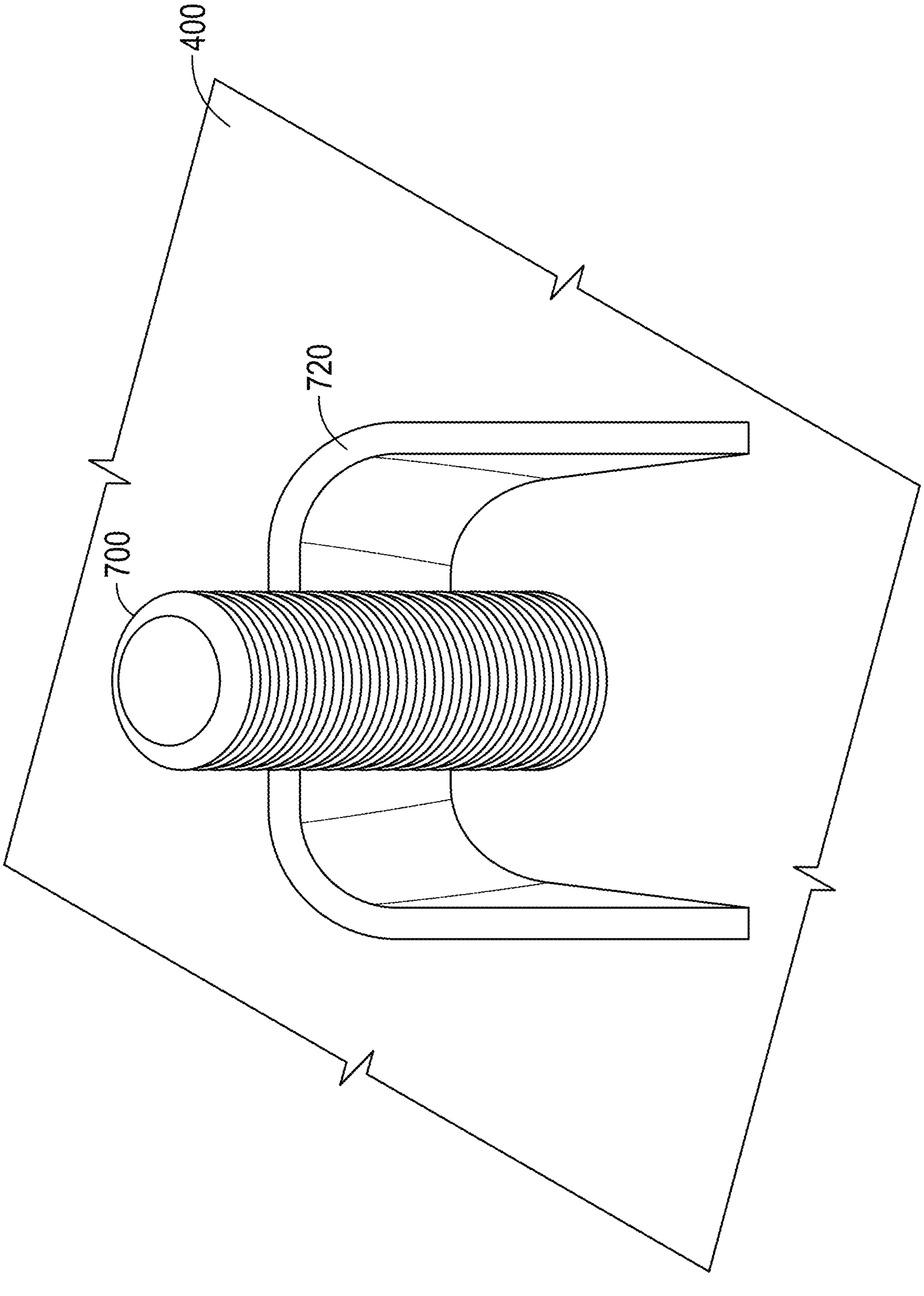
FIG. 4C is an illustration of an air dam a threaded stud for a combustor of a gas turbine engine, in accordance with an embodiment of the disclosure.
Figure 4D:
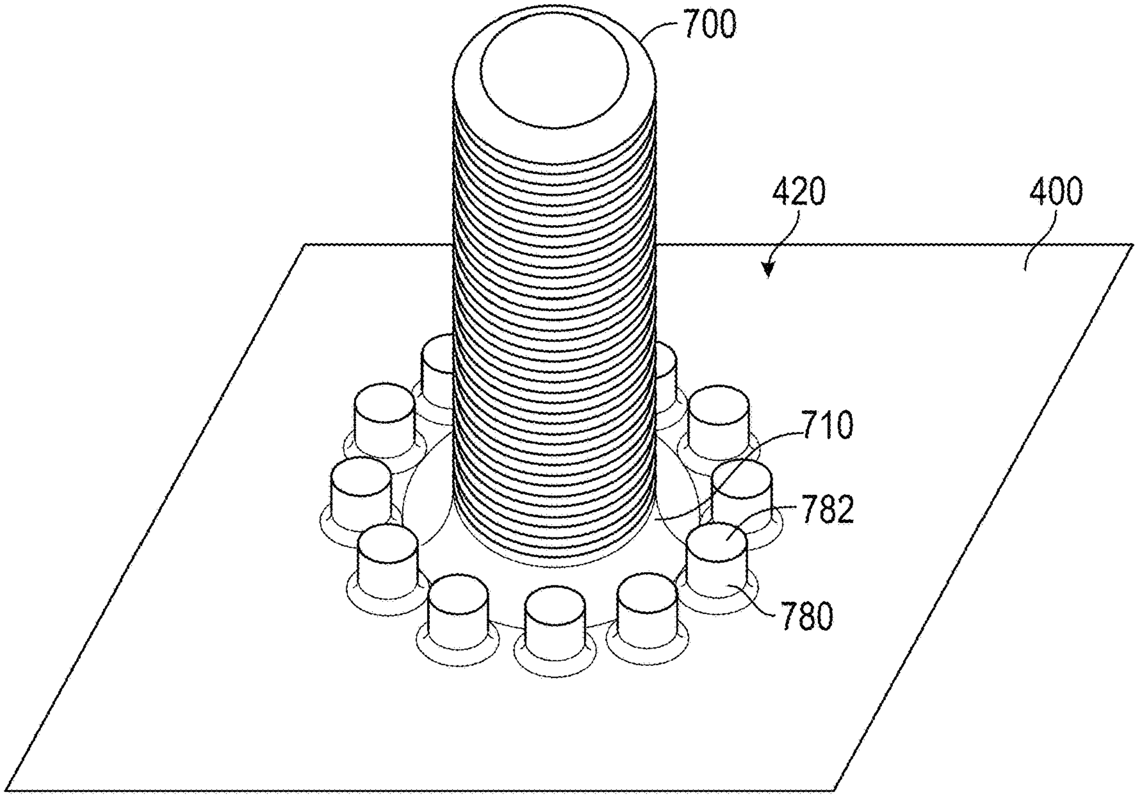
Figure 4E:
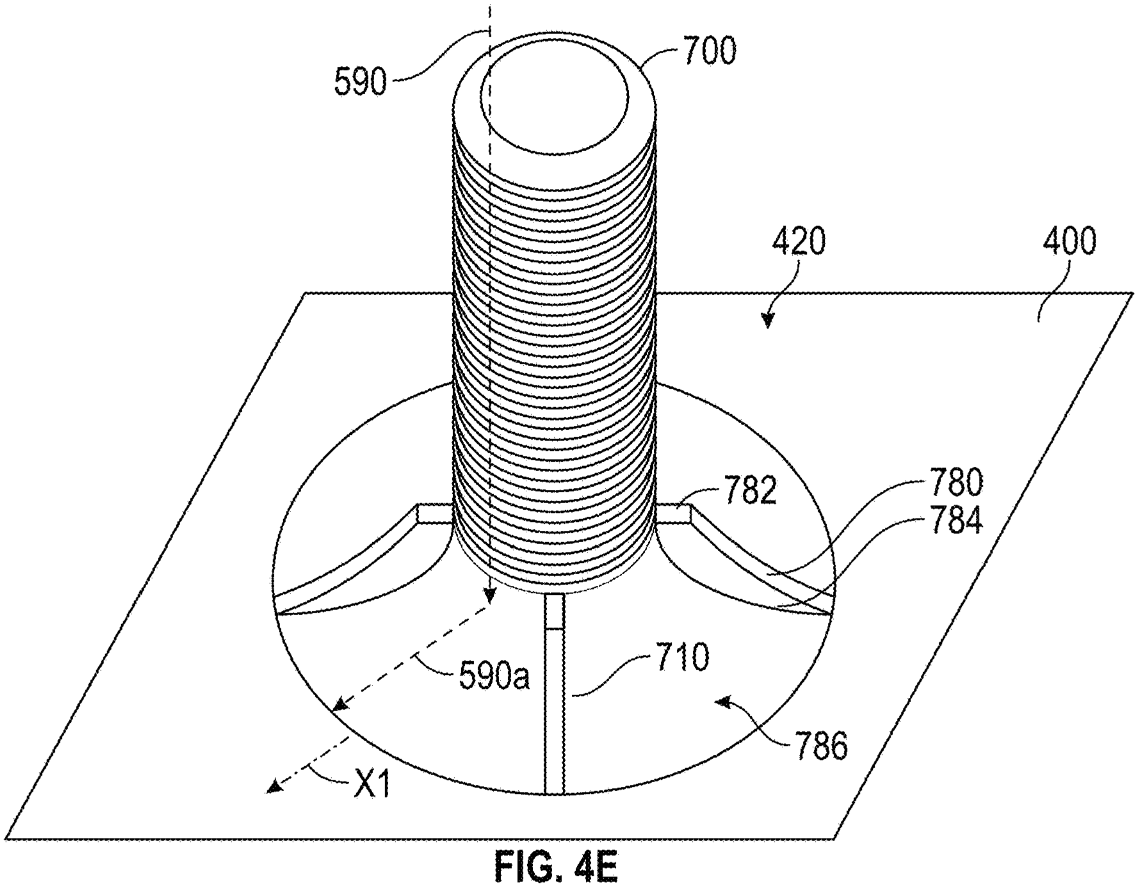

FIG. 4D is an illustration of a configuration of lateral flow injection using a faired body attached to a threaded stud for a combustor of a gas turbine engine, in accordance with an embodiment of the disclosure; and FIG. 4E is an illustration of a configuration of lateral flow injection using a faired body attached to a threaded stud for a combustor of a gas turbine engine, in accordance with an embodiment of the disclosure.

The detailed description explains embodiments of the present disclosure, together with advantages and features, by way of example with reference to the drawings.

DETAILED DESCRIPTION

A detailed description of one or more embodiments of the disclosed apparatus and method are presented herein by way of exemplification and not limitation with reference to the Figures.

Combustors of gas turbine engines, as well as other components, experience elevated heat levels during operation. Impingement and convective cooling of panels of the combustor wall may be used to help cool the combustor. Convective cooling may be achieved by air that is channeled between the panels and a liner of the combustor. Impingement cooling may be a process of directing relatively cool air from a location exterior to the combustor toward a back or underside of the panels.

Thus, combustion liners and heat shield panels are utilized to face the hot products of combustion within a combustion chamber and protect the overall combustor shell. The combustion liners may be supplied with cooling air including dilution passages which deliver a high volume of cooling air into a hot flow path. The cooling air may be air from the compressor of the gas turbine engine. The cooling air may impinge upon a back side of a heat shield panel that faces a combustion liner inside the combustor. The cooling air may contain particulates, which may build up on the heat shield panels overtime, thus reducing the cooling ability of the cooling air. Embodiments disclosed herein seek to address particulate adherence to the heat shield panels in order to maintain the cooling ability of the cooling air.

Figure 1:
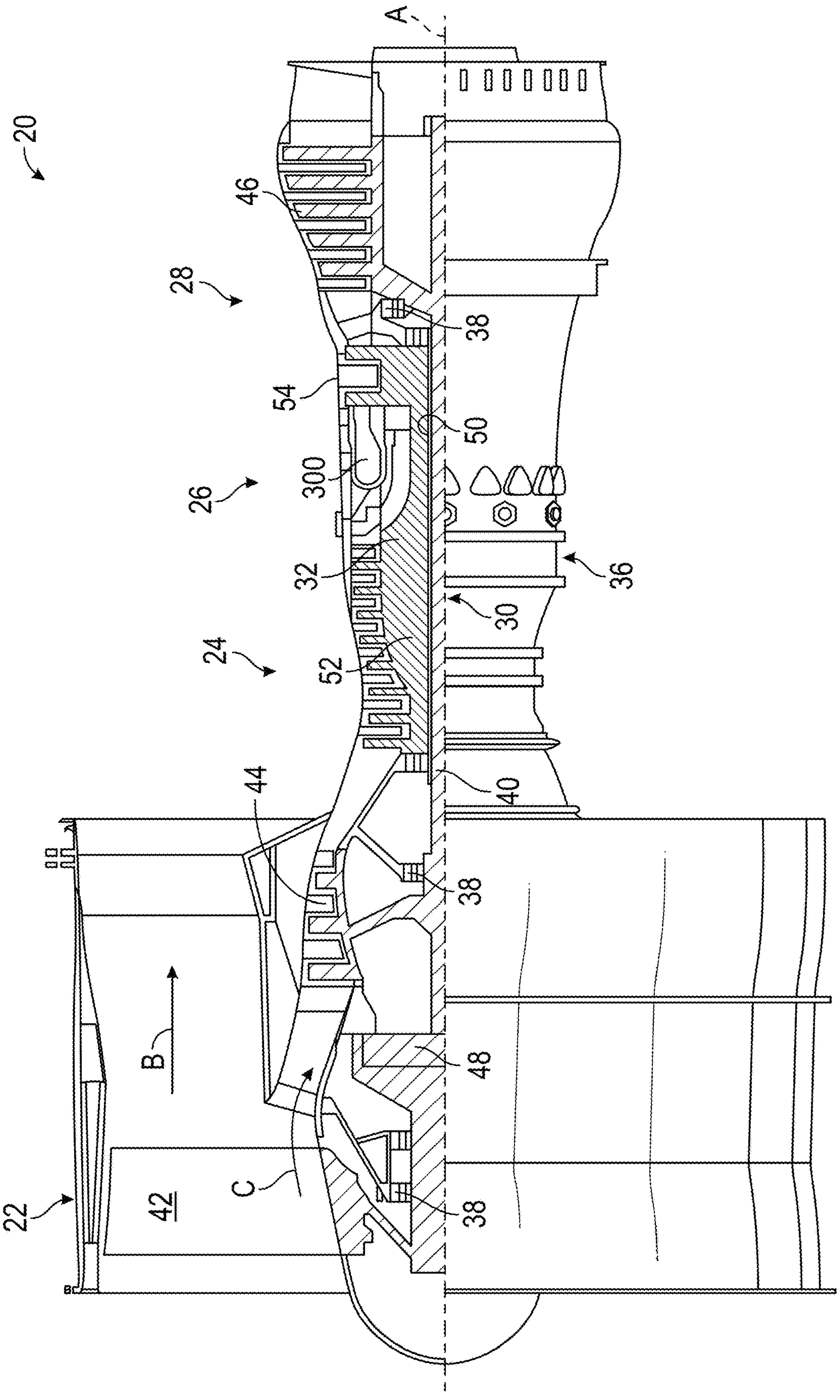
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 300 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 300, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ^\circ \text{ R})/(518.7^\circ \text{ R})]^{0.5}$. The "Low corrected fan tip speed" as disclosed herein according to one non-limiting embodiment is less than about 1150 ft/second (350.5 m/sec).

Figure 2:
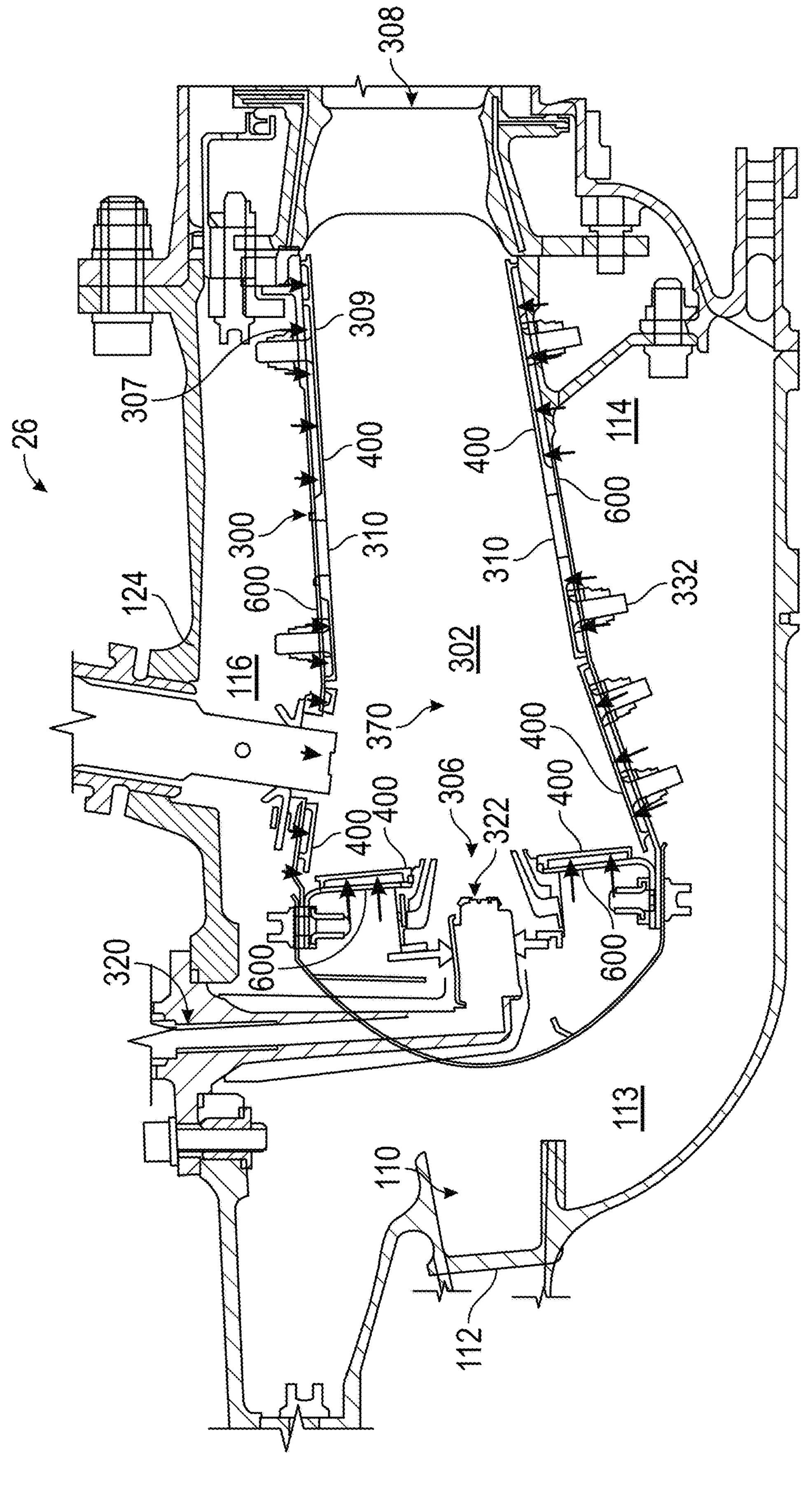
FIG. 2 is a cross-sectional illustration of a combustor, in accordance with an embodiment of the disclosure.

Referring now to FIG. 2 and with continued reference to FIG. 1, the combustor section 26 of the gas turbine engine 20 is shown. As illustrated, a combustor 300 defines a combustion chamber 302. The combustion chamber 302 includes a combustion area 370 within the combustion chamber 302. The combustor 300 includes an inlet 306 and an outlet 308 through which air may pass. The air may be supplied to the combustor 300 by a pre-diffuser 110. Air may also enter the combustion chamber 302 through other holes in the combustor 300 including but not limited to quench holes 310, as seen in FIG. 2.

Compressor air is supplied from the compressor section 24 into a pre-diffuser strut 112. As will be appreciated by those of skill in the art, the pre-diffuser strut 112 is configured to direct the airflow into the pre-diffuser 110, which then directs the airflow toward the combustor 300. The combustor 300 and the pre-diffuser 110 are separated by a shroud chamber 113 that contains the combustor 300 and includes an inner diameter branch 114 and an outer diameter branch 116. As air enters the shroud chamber 113, a portion of the air may flow into the combustor inlet 306, a portion may flow into the inner diameter branch 114, and a portion may flow into the outer diameter branch 116.

The air from the inner diameter branch 114 and the outer diameter branch 116 may then enter the combustion chamber 302 by means of one or more primary apertures 307 in the combustion liner 600 and one or more secondary apertures 309 in the heat shield panels 400. The primary apertures 307 and secondary apertures 309 may include nozzles, holes, etc. The air may then exit the combustion chamber 302 through the combustor outlet 308. At the same time, fuel may be supplied into the combustion chamber 302 from a fuel injector 320 and a pilot nozzle 322, which may be ignited within the combustion chamber 302. The combustor 300 of the engine combustion section 26 may be housed within a shroud case 124 which may define the shroud chamber 113.

Figure 3:
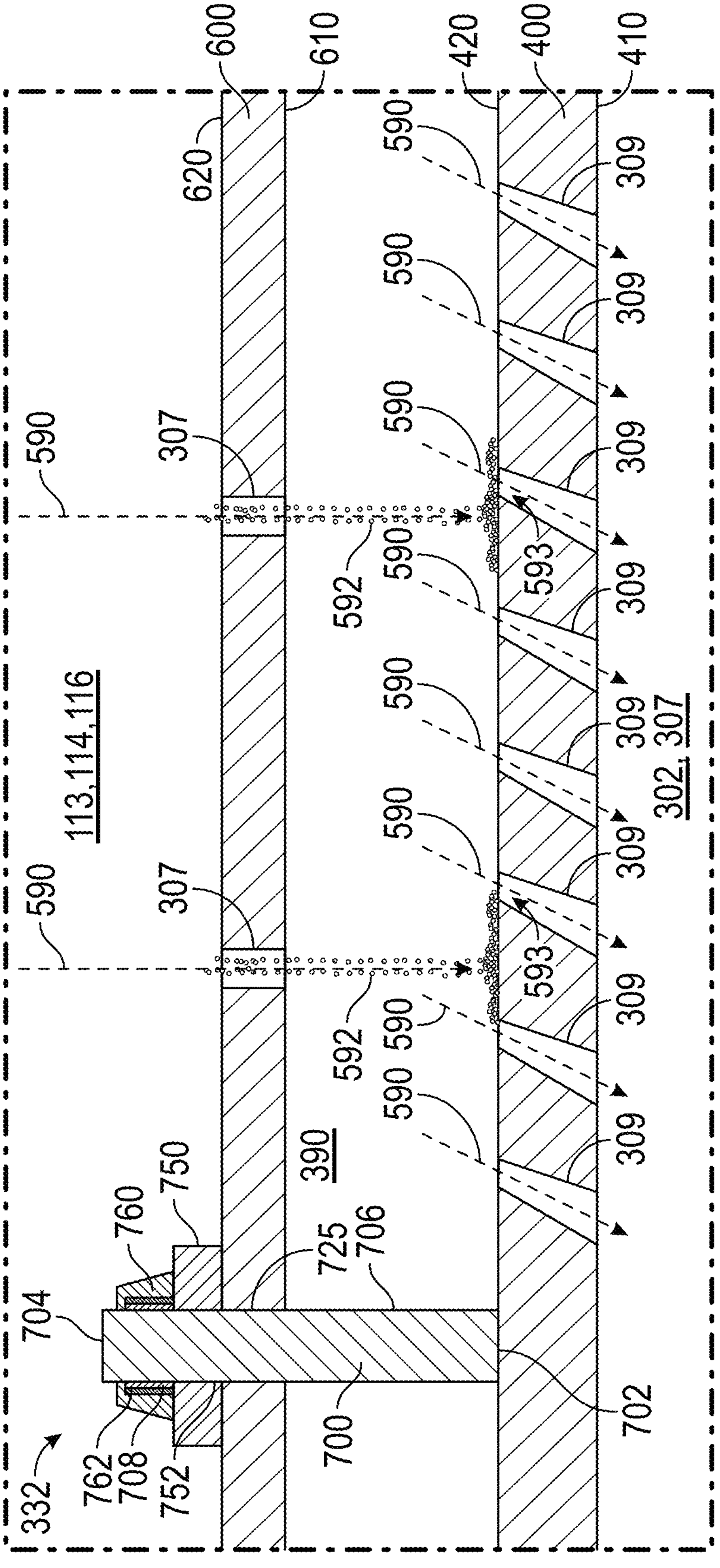
FIG. 3 (Prior Art)
FIG. 3 is an enlarged cross-sectional illustration of a heat shield panel and combustion liner of a combustor, in accordance with an embodiment of the disclosure.

The combustor 300, as shown in FIG. 2, includes multiple heat shield panels 400 that are attached to the combustion liner 600 (See FIG. 3). The heat shield panels 400 may be arranged parallel to the combustion liner 600. The combustion liner 600 can define circular or annular structures with the heat shield panels 400 being mounted on a radially inward liner and a radially outward liner, as will be appreciated by those of skill in the art. The heat shield panels 400 can be removably mounted to the combustion liner 600 by one or more attachment mechanisms 332. In some embodiments, the attachment mechanism 332 may be integrally formed with a respective heat shield panel 400, although other configurations are possible. In some embodiments, the attachment mechanism 332 may be a bolt or other structure that may extend from the respective heat shield panel 400 through the interior surface to a receiving portion or aperture of the combustion liner 600 such that the heat shield panel 400 may be attached to the combustion liner 600 and held in place. The heat shield panels 400 partially enclose a combustion area 370 within the combustion chamber 302 of the combustor 300.

Referring now to FIGS. 3, 4A-4E, and 5 with continued reference to FIGS. 1 and 2. FIG. 3 illustrates a heat shield panel 400, combustion liner 600 of a combustor 300 (see FIG. 1) of a gas turbine engine 20 (see FIG. 1), and an attachment mechanism 332 to attached the heat shield panel 400 to the combustion liner 600. The heat shield panel 400 and the combustion liner 600 are in a facing spaced relationship. The heat shield panel 400 includes a first surface 410 oriented towards the combustion area 370 of the combustion chamber 302 and a second surface 420 first surface opposite the first surface 410 oriented towards the combustion liner 600. The combustion liner 600 having an inner surface 610 and an outer surface 620 opposite the inner surface 610. The inner surface 610 is oriented toward the heat shield panel 400. The outer surface 620 is oriented outward from the combustor 300 proximate the inner diameter branch 114 and the outer diameter branch 116.

The combustion liner 600 includes a plurality of primary apertures 307 configured to allow airflow 590 from the inner diameter branch 114 and the outer diameter branch 116 to enter an impingement cavity 390 in between the combustion liner 600 and the heat shield panel 400. Each of the primary apertures 307 extend from the outer surface 620 to the inner surface 610 through the combustion liner 600.

Each of the primary apertures 307 fluidly connects the impingement cavity 390 to at least one of the inner diameter branch 114 and the outer diameter branch 116. The heat shield panel 400 may include one or more secondary apertures 309 configured to allow airflow 590 from the impingement cavity 390 to the combustion area 370 combustion chamber 302.

Each of the secondary apertures 309 extend from the second surface 420 to the first surface 410 through the heat shield panel 400. Airflow 590 flowing into the impingement cavity 390 impinges on the second surface 420 of the heat shield panel 400 and absorbs heat from the heat shield panel 400 as it impinges on the second surface 420. As seen in FIG. 3, particulate 592 may accompany the airflow 590 flowing into the impingement cavity 390. Particulate 592 may include but is not limited to dirt, smoke, soot, volcanic ash, or similar airborne particulate known to one of skill in the art. As the airflow 590 and particulate 592 impinge upon the second surface 420 of the heat shield panel 400, the particulate 592 may begin to collect on the second surface 420, as seen in FIG. 3. Particulate 592 collecting upon the second surface 420 of the heat shield panel 400 reduces the cooling efficiency of airflow 590 impinging upon the second surface 420 and thus may increase local temperatures of the heat shield panel 400 and the combustion liner 600. Particulate 592 collection upon the second surface 420 of the heat shield panel 400 may potentially create a blockage 593 to the secondary apertures 309 in the heat shield panels 400, thus reducing airflow 590 into the combustion area 370 of combustion chamber 302. The blockage 593 may be a partial blockage or a full blockage.

An attachment mechanism 332 is also illustrated in FIG. 3. As described above, the heat shield panels 400 can be removably mounted to the combustion liner 600 by one or more attachment mechanisms 332. In the example illustrated in FIG. 3, the attachment mechanism 332 includes a threaded stud 700 integrally formed with a respective heat shield panel 400. The threaded stud 700 extends from the second surface 420 of the heat shield panel 400 through the impingement cavity 390 through a receiving aperture 725 of the combustion liner 600 such that the heat shield panel 400 may be attached to the combustion liner 600 and held in place. The threaded stud 700 is integrally formed with the heat shield panel 400 at a first end 702. The threaded stud 700 includes a second end 704 opposite the first end 702. The threaded stud 700 includes external threads 708 on a cylindrical surface 706 of the threaded stud 700 proximate the second end 704 of the threaded stud 700. The external threads 708 are configured to mesh with internal threads 762 of a nut 760. The internal threads 762 are configured to mesh with the external threads 708 of the threaded stud 700. The nut 760 is configured to screw on to the threaded stud 700 and secure the threaded stud 700 to the combustion liner 600. A washer 750 may be axially interposed between the nut 760 and the outer surface 620 of the combustion liner 600. The washer 750 includes a receiving hole 752 such that washer 750 may be slid onto the second end 704 of the threaded stud 700 when the threaded stud is inserted into the receiving hole 752.

As illustrated in FIGS. 4A-4B, the attachment mechanism 332 may include a lateral flow injection system 500 configured to direct airflow from an airflow path D into the impingement cavity 390 in about a lateral direction X1 such that a cross flow 590*a* is generated in the impingement cavity 390. The lateral flow injection system 500 includes a faired body 710 located proximate the first end 702 of the threaded stud 700 and at least one injection aperture 730*a-b* (FIG. 4A), 730*c* (FIG. 4B). Airflow 590 is directed towards the faired body 710 by the injection aperture 730*a-b* (FIG. 4A), 730 (FIG. 4B) and the faired body 710 is shaped to redirect the airflow 590 in a lateral direction X1 such that a cross flow 590*a* is generated. The injection aperture 730*a-b* (FIG. 4A), 730*c* (FIG. 4B) is fluidly connected the impingement cavity 390 to the shroud chamber 113, the inner diameter branch 114, and the outer diameter branch 116. The lateral direction X1 may be parallel relative to the second surface 420 of the heat shield panel 400. Advantageously, the addition of a lateral flow injection system 500 to the combustion liner 600 generates a lateral airflow 590*a* thus promoting the movement of particulate 592 through the impingement cavity 390, thus reducing the amount of particulate 592 collecting on the second surface 420 of the heat shield panel 400, as seen in FIG. 4A. Also advantageously, if the impingement cavity 390 includes an exit 390*a*, the addition of a lateral flow injection system 500 to the combustion liner 600 generates a lateral airflow 590*a* thus promoting the movement of particulate 592 through the impingement cavity 390 and towards the exit 390*a* of the impingement cavity 390. Although only one is illustrated in FIGS. 4A-4B, the combustion liner 600 may include one or more lateral flow injection systems 500.

The faired body 710 may be integrally formed from at least one of the heat shield panel 400 and the threaded stud 700. The faired body 710 may be integrally formed with the heat shield panel 400 when the threaded stud 700 is formed from the heatshield panel 400, such as, for example a fillet between the threaded stud 700 and the heat shield panel 400. In an embodiment, the faired body 710 may be a fillet having a radius about equal to or greater than 0.020 inches (0.0508 cm). The faired body 710 may be formed separate and apart (i.e. a separate piece) from the threaded stud 700 and is operably attached to the threaded stud 700. In one example, if the faired body 710 is a fillet, the fillet may also be added after the thread stud 700 and the heat shield panel 400 are formed.

FIG. 4A illustrates that one or more injection apertures 730*a* may be located in the washer 750. The injection apertures 730*a* may fluidly connect to the impingement cavity 390 through the receiving aperture 725, as shown in FIG. 4A. Airflow 590 from the shroud chamber 113, the inner diameter branch 114, and/or the outer diameter branch 116 is channeled through the injection apertures 730*a* and the receiving aperture 725 and is directed towards a faired body 710. The faired body 710 is shaped such that airflow 590 is redirected in about the lateral direction X1 such that a lateral airflow 590*a* is generated in the impingement cavity 390.

FIG. 4A also illustrates that one or more injection apertures 730*b* located in the threated stud 700. The injection apertures 730*b* may fluidly connect to the impingement cavity 390, as shown in FIG. 4A. One or more passageways 732 located in the threaded stud 700 may fluidly connect the injection apertures 730*b* to the shroud chamber 113, the inner diameter branch 114, and/or the outer diameter branch 116. Airflow 590 from the shroud chamber 113, the inner diameter branch 114, and/or the outer diameter branch 116 is channeled through the injection apertures 730*b* and is directed towards a faired body 710. The faired body 710 is shaped such that airflow 590 is redirected in about the lateral direction X1 such that a lateral airflow 590*a* is generated in the impingement cavity 390.

An additional injection aperture may be located on the cylindrical surface 706 of the threaded stud 700. For example, the external threads 708 on a cylindrical surface 706 of the threaded stud 700 may only extend partially around the cylindrical surface 706 (i.e. the external threads 708 may not extend 360° around the cylindrical surface 706), thus creating a gap between the cylindrical surface 706 and the nut 760/washer 750. Airflow 590 may be channeled through the gap between the cylindrical surface 706 and the nut 760, through the gap between the cylindrical surface 706 and the washer 750, through the receiving aperture 725, and into the impingement cavity 390. In an example, the external threads 708 may extend 120° around the cylindrical surface 706.

FIG. 4B illustrates that one or more injection apertures 730*c* may be located in the washer 750. In the example, illustrated in the injection aperture 730*c* is the receiving hole 752 of the washer 750. An inner diameter of the receiving hole 752 has been expanded such that there is now a gap 754 between the receiving hole 752 of the washer 750 and cylindrical surface 706 of the threaded stud 700. Further, the nut is offset by an offset distance D1 from the washer 750 such that an air channel 756 may be formed between the nut 760 and the washer 750. The air channel 756 fluidly connects the injection apertures 730*c* to the shroud chamber 113, the inner diameter branch 114, and/or the outer diameter branch 116. The injection apertures 730*c* may fluidly connect to the impingement cavity 390 through the receiving aperture 725, as shown in FIG. 4B. Airflow 590 from the shroud chamber 113, the inner diameter branch 114, and/or the outer diameter branch 116 is channeled through the air channel 756, the injection apertures 730*c*, and the receiving aperture 725 and is directed towards a faired body 710. The faired body 710 is shaped such that airflow 590 is redirected in about the lateral direction X1 such that a lateral airflow 590*a* is generated in the impingement cavity 390.

An air dam 720 may project into the impingement cavity 390 from the second surface 420 of the heat shield panel 400. The air dam 720 may be integrally formed from the heat shield panel 400 or attached to the second surface 420 of the heat shield panel 400. The air dam 720 may partially encircle the threaded stud 700, as seen in FIG. 4C. The air dam 720 is configured to redirect air flow 590 from an injection aperture 730*a-c* that has been redirected by the faired body 710 and generate a lateral air flow 590*a* in a selected direction.

FIG. 4D illustrates the threaded stud 700 being surrounded by push pins 780. The push pins 780 extend out from the second surface 420 of the heat shield panel 400 into the impingement cavity 390. The push pins 780 are an artifact of the manufacturing process of the heat shield panel 400 and threaded studs 700. Push pins 780 are included around the threaded stud 700 so that an ejector rod to be utilized during manufacturing to provide a force perpendicular to the second surface 420 in order to remove the heat shield panel 400 away from a negative mold of the heat shield panel 400. The push pins 780 may also be used as a standoff feature such that the nut cannot be drawn too far down and decrease the size of the impingement cavity 390 too much. Conventional push pins 780 are cylindrical in shape and have a flat top 782, as seen in FIG. 4D. The faired body 710 may be integrally formed with the push pins 780 and shaped into channel walls 784 such that airflow 590 may be channeled away from the threaded stud 700 through channels 786 radially interposed between the channel walls 784 and a lateral airflow 980*a* may be generated in about a lateral direction X1, as shown in FIG. 4E.

It is understood that a combustor of a gas turbine engine is used for illustrative purposes and the embodiments disclosed herein may be applicable to additional components of other than a combustor of a gas turbine engine, such as, for example, a first component and a second component defining a cooling channel therebetween. The second component may have cooling holes similar to the primary orifices. The cooling holes may direct air through the cooling channel to impinge upon the first component.

Technical effects of embodiments of the present disclosure include incorporating faired body onto a threaded stud connecting a heat shield panel to a combustion liner to introduce lateral airflow across a heat shield panel surrounding a combustion chamber to help reduce collection of particulates on the heat shield panel and also help to reduce entry of the particulate into the combustion chamber.

The term "about" is intended to include the degree of error associated with measurement of the particular quantity based upon the equipment available at the time of filing the application. For example, "about" can include a non-limiting range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A gas turbine engine component assembly, comprising:

a first component having a first surface and a second surface;

a threaded stud including a first end and a second end opposite the first end, the threaded stud extending from the second surface of the first component;

a faired body operably secured to the threaded stud, wherein the faired body is shaped to redirect an airflow in a lateral direction parallel to the second surface of the first component such that a cross flow is generated;

a second component having an inner surface, an outer surface opposite the inner surface of the second component, a cooling hole extending from the outer surface of the second component to the inner surface of the second component through the second component, and a receiving aperture extending from the outer surface to the inner surface through the second component, wherein the inner surface of the second component and the second surface of the first component define a cooling channel therebetween in fluid communication with the cooling hole for cooling the second surface of the first component, wherein the threaded stud extends from the second surface of the first component through the cooling channel and through the receiving aperture of the second component;

an injection aperture fluidly connecting the airflow in an airflow path proximate the outer surface of the second component to the cooling channel and configured to convey the airflow into the cooling channel towards the faired body;

a nut located at the second end of the threaded stud, the nut having internal threads configured to mesh with external threads located on a cylindrical surface of the threaded stud at the second end of the threaded stud; and a washer axially interposed between the nut and the outer surface of the second component, the washer having a solid portion that defines an opening for receiving the threaded stud therein and the washer having the injection aperture located between a peripheral portion of the nut and a peripheral portion of the washer such that the injection aperture is located past a diameter of the nut and the solid portion of the washer separates the injection aperture from the opening defined by the solid portion and the injection aperture is fluidly connected to the airflow in the airflow path through the cooling channel.

2. The gas turbine engine component assembly of claim 1, wherein the faired body is integrally formed from at least one of the first component and the threaded stud.

3. The gas turbine engine component assembly of claim 2, wherein the faired body is a fillet between the threaded stud and the first component.

4. The gas turbine engine component assembly of claim 1, wherein the injection aperture is fluidly connected to the cooling channel through the receiving aperture.

5. The gas turbine engine component assembly of claim 1, wherein the first component is a heat shield of a combustor and the second component is a liner of the combustor.

6. The gas turbine engine component assembly of claim 1, wherein the threaded stud has a passage way providing fluid communication between an exterior surface of the threaded stud located above the nut and the cooling channel.

7. The gas turbine engine component assembly of claim 6, wherein the injection aperture of the washer is one of a plurality of injection apertures located between the peripheral portion of the nut and the peripheral portion of the washer.

8. The gas turbine engine component assembly of claim 7, wherein the first component is a heat shield of a combustor and the second component is a liner of the combustor.

9. The gas turbine engine component assembly of claim 1, wherein the threaded stud has a passage way providing fluid communication between a top of the threaded stud and opposite sides of the threaded stud located in the cooling channel.

10. The gas turbine engine component assembly of claim 9, wherein the first component is a heat shield of a combustor and the second component is a liner of the combustor.

11. The gas turbine engine component assembly of claim 1, wherein the injection aperture of the washer is one of a plurality of injection apertures located between the peripheral portion of the nut and the peripheral portion of the washer.

12. The gas turbine engine component assembly of claim 1, wherein the injection aperture extends directly from a radially outer surface of the washer to a radially inner surface of the washer.

* * * * *